Jan. 7, 1958 W. K. SQUIRES 2,819,334

TELEVISION RECEIVER

Filed Oct. 27, 1954 2 Sheets-Sheet 1

INVENTOR.
William K. Squires
BY Mason, Kolehmainen, Rathburn & Wyss

INVENTOR.
William K. Squires
BY Mason, Kolehmainen, Rathburn & Wyss
Attys 2,819,334
Patented Jan. 7, 1958

2,819,334

TELEVISION RECEIVER

William K. Squires, Snyder, N. Y., assignor to Sylvania Electric Products, Inc., a corporation of Massachusetts Application October 27, 1954, Serial No. 464,991

9 Claims. (Cl. 178—5.4)

Figures 1, 2:
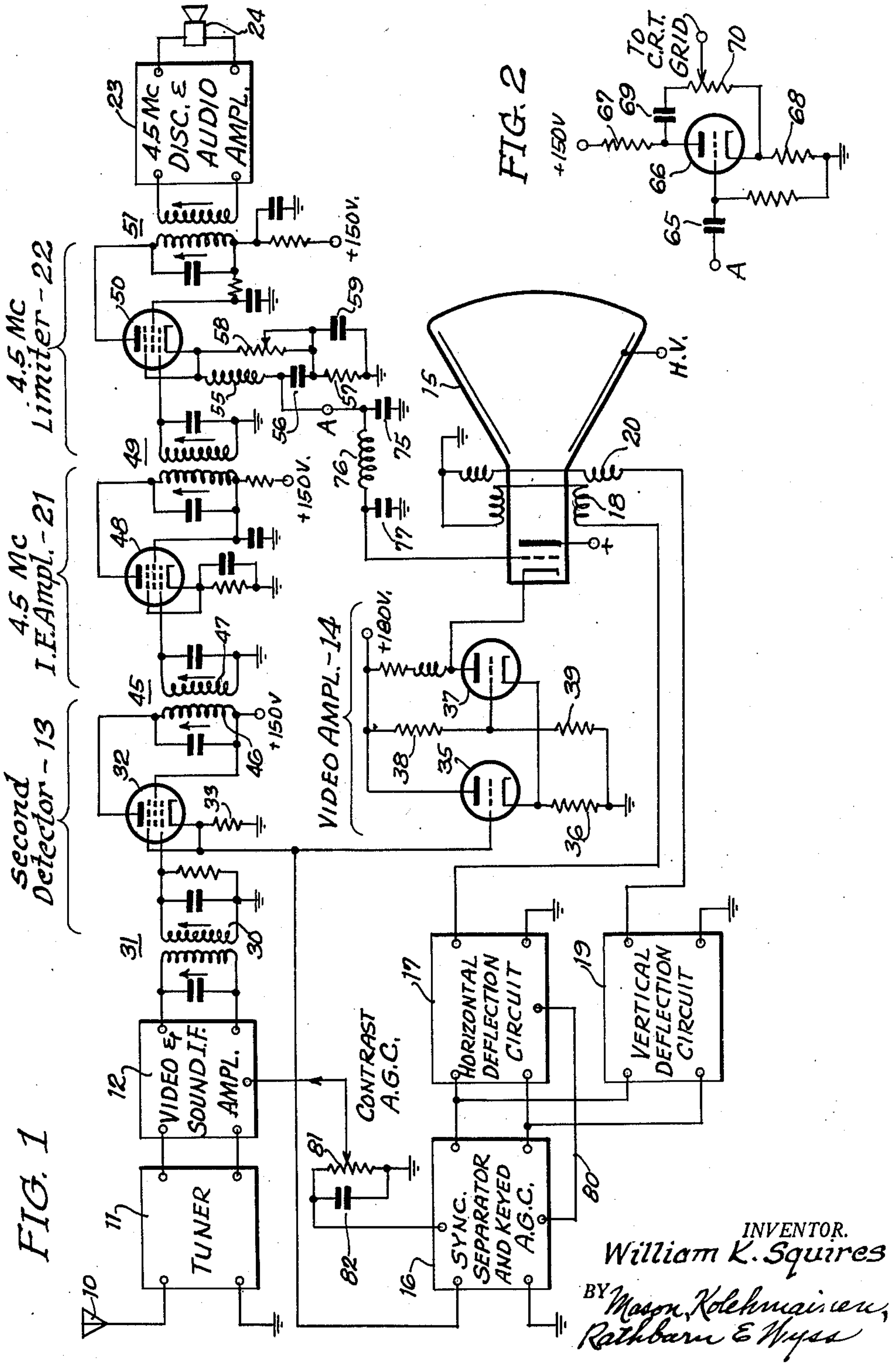

The present invention relates to television receivers, more particularly to television receivers of either the monochrome or polychrome type, and the invention has for an object the provision of a new and improved method of and apparatus for preventing the appearance of undesired frequency components in the reproduced television picture without introducing phase distortion of the remaining video components of the reproduced picture.

In both monochrome and polychrome television receivers of the intercarrier sound type the video I. F. signal is detected in the second detector to derive the desired video or picture signal while at the same time video and sound carriers are heterodyned in the second detector and produce, under present television standards, a 4.5 mc. beat note signal corresponding to the 4.5 mc. separation of the video and sound carriers. In some types of receivers the 4.5 mc. beat note signal is amplified along with the detected video signal and in other receivers the 4.5 mc. intercarrier sound signal is separated from the video signal either before the second detector or immediately thereafter, the separated 4.5 mc. signal being suitably amplified and applied to a frequency discriminator circuit to derive the sound signal which is applied to a conventonal loud-speaker. Regardless of the manner in which the 4.5 mc. intercarrier sound signal is separated from the video signal, it is necessary to remove the 4.5 mc. beat frequency component from the video signal before it is applied to the picture tube to prevent an undesirable cross-hatch pattern from being produced in the television picture. This undesired beat frequency component is usually removed by employing a 4.5 mc. trap circuit or filter network in the first video stage which consists of inductance and capacitance elements which resonate at 4.5 mc. and attenuate the 4.5 mc. signal by the desired amount. However, the conventional 4.5 trap circircuit is comprised of reactive elements and inherently produces a large amount of phase distortion of other frequency components of the video signal with the result that the transient response of the receiver is poor, overshoot is produced in subsequent stages and ringing transients cause a blurring of the fine detail of the picture. These effects are particularly noticeable in present day large screen receivers wherein the above described phase distortion due to the 4.5 mc. trap circuit produces serious ringing effects even through the television transmission standards of video band-width and definition are adequate to produce a sharp clear picture.

In color television receivers a further problem arises due to the fact that the color subcarrier, which under present color television standards has a frequency of 3.58 mc., falls within the video pass band and must be removed to prevent the appearance of the 3.58 mc. subcarrier signal in the reproduced picture. Furthermore, the 3.58 mc. must be removed to prevent the development of an objectionable 920 kc. beat note component, which can arise by heterodyning action between the 4.5 mc. intercarrier sound signal and the 3.58 color subcarrier signal in any non-linear element such as the picture tube, and which appears as continuous bars in the reproduced color picture. This 3.58 mc. signal is conventionally removed by means of a resonant trap circuit which is tuned to 3.58 mc. and inherently produces undesired phase distortion of other frequency components of the video signal with the same objectionable results discussed above in connection with the 4.5 mc. intercarrier sound signal.

It is, therefore, another object of the present invention to provide a new and improved method of and apparatus for substantially entirely removing an undesired frequency component from the video signal which is applied to the picture tube of a television receiver without altering the transient response of the receiver by any substantial amount.

It is a further object of the present invention to provide a new and improved method of and apparatus for improving the fine detail of a reproduced television picture of either the monochrome or polychrome type without increasing the cost or complexity of the television receiver.

It is a still further object of the present invention to provide a new and improved method of and apparatus for substantially entirely removing the 4.5 mc. intercarrier sound signal from the video signal which is applied to the television picture tube wthout producing phase distortion of the remaining frequency components of said video signal.

It is another object of the present invention to provide a new and improved method of and apparatus for substantially entirely removing the 3.58 mc. color subcarrier signal from the luminance signal which is applied to the color picture tube of a color television receiver without producing substantial phase distortion of the other frequency components of said luminance signal.

Briefly, in accordance with one phase of the invention, a common video and sound carrier amplifier channel is provided in a television receiver, which may be of either the monochrome or polychrome type, the output of this channel being connected to a second detector for deriving the video or luminance signal. A 4.5 mc. beat note component having a frequency equal to the frequency difference between the video and sound carriers is inherently produced in the second detector and this 4.5 mc. beat note component must be removed from the video signal to prevent an objectionable cross-hatch pattern from appearing in the reproduced picture. Normally this 4.5 mc. beat note component is removed by means of a tuned circuit which is resonant at 4.5 mc. However, such tuned circuits introduce serious phase distortion of the other frequency components of the video signal so that the transient response of the receiver is impaired and blurring of the fine detail of the picture results. In accordance with the present invention, no 4.5 mc. trap circuit is employed but instead a 4.5 mc. signal is derived from the conventional intercarrier sound channel and is mixed with the video signal in such manner as completely to remove the objectionable 4.5 mc. beat note component without producing phase distortion of the other frequency components of the video signal. In one embodiment of this phase of the invention the video signal with the objectionable 4.5 mc. beat note component included therein is impressed upon one electrode of the cathode ray picture tube and the cancelling 4.5 mc. signal, which is of the same amplitude and phase as the beat note component in the video signal, is impressed upon another control grid of the cathode ray tube so as to remove the 4.5 mc. beat note component within the cathode ray tube itself and without employing an additional mixing stage.

In accordance with another phase of the invention, the 3.58 mc. color subcarrier signal, which is developed in the luminance second detector of a color television receiver, is removed without employing phase distortion producing trap circuits by deriving a 3.58 mc. cancellation signal from the chroma amplifier of the color television receiver, this 3.58 mc. cancellation signal being of the same amplitude and of the correct phase to exactly cancel the 3.58 mc. component of the luminance signal. The 3.58 mc. cancellation signal and the luminance signal are then mixed, preferably before application to the color picture tube, to remove the 3.58 mc. subcarrier component from the luminance signal without producing phase distortion of the other frequency components of the luminance signal.

Figure 3:
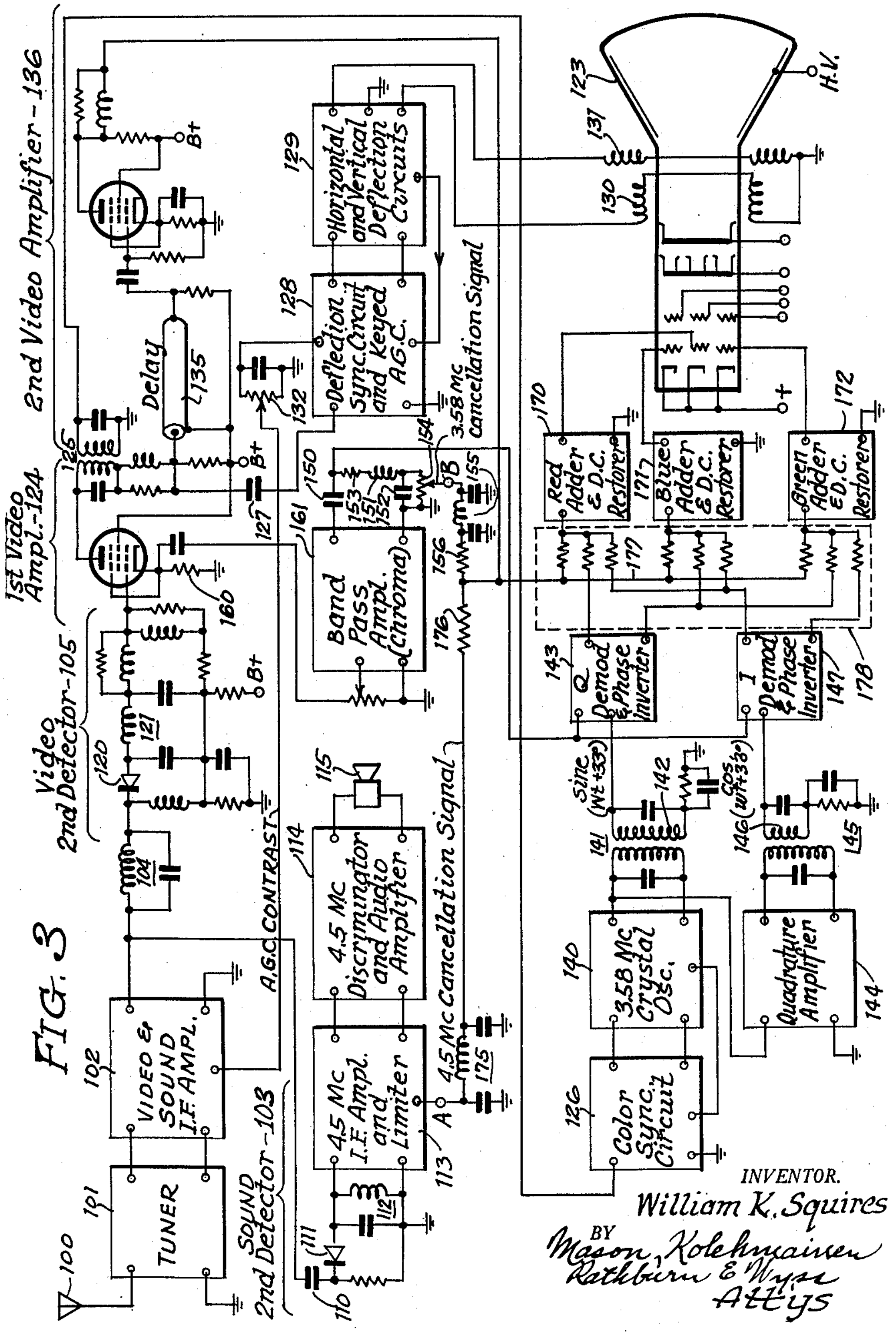

The invention, both as to its organization and method of operation, together with further objects and advantages thereof, will best be understood by reference to the following specification taken in connection with the accompanying drawings, in which:

Fig. 1 of the drawings is a schematic diagram, partly in block diagram form, of a monochrome television receiver embodying the features of the present invention;

Fig. 2 is a schematic diagram of a test arrangement employed to determine the required phase shift in the television system of Fig. 1; and Fig. 3 is a schematic diagram, partly in block diagram form, of a color television receiver embodying the features of the present invention.

Referring now to Fig. 1 of the drawings, the system therein illustrated comprises a modulated carrier wave monochrome television receiver of the superheterodyne type including an antenna system 10, connected to a tuner 11, to which are connected in cascade relation in the order named, a video and sound I. F. amplifier 12, a second detector 13, a video amplifier 14 and a cathode ray tube viewing device 15. The detected modulation components developed in the detector 13 are coupled to a sync separator and keyed AGC circuit 16 wherein the horizontal and vertical synchronizing pulses are separated from the other components of the composite television signal, the horizontal synchronizing pulses being supplied to a horizontal deflection circuit 17 which is arranged to develop a suitable horizontal scanning wave in the horizontal scanning coils 18 which surround the neck of the cathode ray tube 15. The vertical synchronizing pulses from the circuit 16 are impressed upon a vertical deflection circuit 19 which functions to supply a suitable vertical scanning wave to the vertical scanning coils 20 which also surrounds the neck of the cathode ray tube 15. The second detector 13 is also arranged to derive from the composite television signal an intercarrier sound signal of a frequency of 4.5 mc. which is supplied to a 4.5 mc. I. F. amplifier 21 the output of which is connected to a 4.5 mc. limiter 22. The limiter 22 supplies a fixed amplitude 4.5 mc. signal to the 4.5 mc. discriminator and audio amplifier 23 wherein the frequency modulated sound signals are derived from the 4.5 mc. intercarrier sound signal and are amplified to a suitable level to energize the loud speaker 24 of the television receiver.

The units 10 to 12, inclusive, 15 to 21, inclusive, 23 and 24 may all be of conventional well-known construction so that a detailed description thereof is considered unnecessary herein. Referring briefly, however, to the operation of the above described system as a whole, television signals intercepted by the antenna system 10 are applied to the tuner 11 wherein they are converted into corresponding intermediate frequency signals which include the video and sound carriers which are spaced apart by 4.5 mc. and are modulated by their respective video and sound signals, these intermediate frequency signals being amplified in the common I. F. amplifier 12 and supplied to the second detector 13. In the detector 13 the video signal is derived and applied to the video amplifier 14 the output of which is connected to the cathode of the cathode ray tube 15. The synchronizing signal components of the video signal are supplied to the sync separator and keyed AGC circuit 16 wherein they are separated and applied to the deflection circuits 17 and 19 so as to provide synchronized horizontal and vertical scanning waves in a manner readily understood by those skilled in the art. A 4.5 mc. intercarrier sound signal is also derived from the detector 13 and is amplified in the I. F. amplifier 21 and limited in the limiter 22 the output of which is connected to the discriminator and audio amplifier 23 for recovery of the frequency modulated sound signals from the intercarrier sound signal in a manner well-known to those skilled in the art.

Referring now more particularly to the portions of the receiver of Fig. 1 which relate to the present invention, the second detector 13 is illustrated as a constant input impedance detector so that the detector does not produce undesired variations in impedance which may affect the response characteristic of the last I. F. amplifier stage of the amplifier 12. More particularly, the secondary 30 of the last interstage coupling transformer 31 in the I. F. amplifier 12 is coupled to the control grid of a pentode type detector tube 32 preferably of the commercial type 6AU6. The cathode of the tube 32 is connected through a resistor 33 to ground and the video signal which is modulated on the video carrier is detected by means of the non-linearity of the grid-plate characteristic of the tube 32 due to the bias afforded by the resistor 33, the detected video signal appearing across the resistor 33 with a polarity such that the synchronizing pulses are positive. The video signal developed across the resistor 33 includes a 4.5 mc. beat note component which is inherently produced in the detection process due to the fact that both the video and sound carriers are applied to the control grid of the detector tube 32. The video signal with the 4.5 mc. beat note component present therein, is impressed upon the control grid of a triode tube 35 in the amplifier 14 which is operated as a cathode follower to develop a corresponding video signal across the cathode resistor 36 thereof. The signal developed across the resistor 36 is impressed upon the cathode of a second triode amplifier tube 37 the anode of the tube 37 being directly connected to the cathode of the picture tube 15. The control grid of the tube 37 is biased positively by means of the resistors 38 and 39 so that proper direct coupled operation of the tubes 35 and 37 is achieved. It will be noted that no trap circuits or other phase shifting networks are contained in the video amplifier 14 so that phase distortion is substantially eliminated in this amplifier throughout the video pass band with the result that the transient response of this amplifier to abrupt changes in the video signal is optimized. It will also be noted that the video amplifier 14 is extremely simple in construction, the tubes 35 and 37 preferably comprising the two triode sections of a double triode tube of the commercial type 12AT7. In this connection, it will be understood that while the video amplifier 14 has been illustrated as being of a particular construction which is simple and economical to manufacture, any other suitable type of video amplifier may be employed wherein transient response is preserved and phase distortion of the video frequency components is prevented.

In order to derive an intercarrier sound signal from which the frequency modulated sound signals may be obtained, the detector 13 is provided with a transformer 45 the primary 46 of which is connected to the anode of the tube 32 and is tuned to 4.5 mc. so as to respond to the intercarrier sound signal. Since the transformer 45 is connected to the anode of the detector tube 32, the transformer 45 is effectively isolated from the cathode circuit of the tube 32 in which the detected video signal appears so that the phase characteristic of the video signal is substantially unaffected by the sharply selective characteristic of the transformer 45 and no phase distortion of certain frequency components of the video signal is produced. In this connection, it will be understood that while the detector 13 is particularly suitable for use in the system of the present invention since it provides substantial gain for the 4.5 mc. signal and isolates the video signal circuit, any other suitable detector circuit may be employed which does not introduce phase distortion into the video channel. Thus, an ordinary diode detector may be used and the 4.5 mc. signal extracted therefrom by means of a 4.5 mc. filter having a resistive input so as not to affect the phase characteristic of the video signal. However, with such an arrangement the gain at 4.5 mc. is substantially reduced. The secondary 47 of the transformer 45 is connected to the control grid of a 4.5 mc. I. F. amplifier tube 48, and an interstage transformer 49, which is also tuned to 4.5 mc., is employed to couple the anode of the tube 48 to the control grid of a 4.5 mc. limiter tube 50. The limiter tube 50 is arranged to remove amplitude modulations from the 4.5 mc. intercarrier sound signal, and an output transformer 51 is connected to the anode of the tube 50, the transformer 51 preferably comprising the discriminator transformer of the conventional 4.5 mc. frequency discriminator circuit 23 whereby the frequency modulated sound signal may be derived from the 4.5 mc. intercarrier sound signal in a manner readily understood by those skilled in the art.

In order to remove the 4.5 mc. beat note component from the video signal which is impressed upon the cathode of the cathode ray tube 15 and without introducing phase distortion in the video amplifier channel, a 4.5 mc. cancellation signal is derived from the limiter 22 and is impressed upon the control grid of the cathode ray tube 15 in the correct amplitude and phase to exactly cancel the undesired beat note component of the video signal. More particularly, a series resonant circuit including the coil 55 and the condenser 56 is connected in series with a cathode bias resistor 57 from the cathode of the limiter tube 50 to ground. A potentiometer 58 is connected across the series resonant circuit 55, 56, the potentiometer 58 providing an adjustable shunt across the series resonant circuit so as to permit adjustment of the amplitude of the 4.5 mc. signal developed thereacross. A by-pass condenser 59 is connected across the cathode bias resistor 57 to provide a fixed bias for the control grid of the limiter tube 50. Since the circuit 55, 56 is series resonant at 4.5 mc. this circuit presents relatively little impedance at resonance to the 4.5 mc. signal impressed upon the control grid of the limiter tube 50 so that relatively little degeneration at this frequency is produced and the tube 50 can function properly as a limiter. However, a relatively large 4.5 mc. signal is developed across the condenser 56 of the series resonant circuit and this signal is employed as a cancellation signal to remove the undesired beat note component from the video signal impressed upon the cathode of the picture tube 15.

In order to provide complete cancellation of the undesired beat note component in the video signal, it is necessary to determine the exact phase angle of this beat note component when the video signal is applied to the cathode of the picture tube 15. Since this phase shift may vary depending upon the circuit constants of the second detector 13, the video amplifier 14, the I. F. amplifier 21 and the limiter 22, a variable phase shifting network may be employed initially to determine the exact amount of phase shift which is necessary to provide complete cancellation of the beat note component and after the amount of phase shift has been determined a suitable fixed filter circuit may be employed to provide the required phase shift. In Fig. 2 of the drawings there is shown a variable phase shifting circuit which may be employed to determine the required amount of phase shift necessary to obtain complete cancellation of the 4.5 mc. beat note component. More particularly, the 4.5 mc. signal which is developed across the condenser 56 and appears at the terminal A in Fig. 1 is coupled through the condenser 65 of the phase shifting network shown in Fig. 2 to the control grid of a triode phase inverter tube 66, the tube 66 having an anode resistor 67 and a cathode resistor 68 of equal value so as to provide 4.5 mc. signals at the anode and cathode of the tube 66 which are separated in phase by 180°. A phase shifting network including the condenser 69 and the potentiometer 70 is connected between the anode and cathode of the tube 66 so that the phase angle of the 4.5 mc. signal developed by the tube 66 may be varied through a relatively wide range.

To determine the required phase shift, the arm of the potentiometer 70 is connected to the control grid of the cathode ray tube 15 shown in Fig. 1 and the phase angle of the 4.5 mc. signal impressed upon this control grid is varied by adjustment of the arm of the potentiometer 70 and the amplitude of the 4.5 mc. cancellation signal is varied by adjustment of the potentiometer 58 until complete cancellation of the undesired 4.5 mc. beat note component of the video signal is obtained. Such cancellation may be determined either by inspection of the picture produced on the cathode ray tube 15 or by suitable oscilloscope techniques, as will be readily understood by those skilled in the art. After the required phase shift has been determined by means of the phase shifting network of Fig. 2, a suitable phase shifting filter circuit is constructed so that the 4.5 mc. signal developed across the condenser 56 may be shifted in phase in a simple and economical manner. More particularly, the final phase shifting network includes the condenser 75, which is connected between the terminal A and ground, the series inductance 76 and the shunt condenser 77 which together form a conventional pi-type phase shifting network as will be readily understood by those skilled in the art, the voltage developed across the condenser 77 being connected directly to the control grid of the cathode ray tube 15. In this connection, it will be understood that any suitable means may be provided to adjust the D. C. potential of either the cathode or the control grid of the cathode ray tube 15 so as to provide the conventional background level adjustment.

In order to maintain cancellation of the 4.5 mc. beat note component while providing a contrast control arrangement whereby the amplitude of the video signal may be varied, the video gain is varied ahead of the second detector 13 so that the amplification in the video amplifier and the 4.5 mc. channel remains constant for all contrast adjustments. More particularly, in the illustrated embodiment, a keyed AGC circuit is provided which is controlled by pulses developed in the horizontal deflection circuit 17 during the horizontal retrace intervals and are supplied to the keyed AGC circuit 16 over the conductor 80, as will be readily understood by those skilled in the art. The keyed AGC circuit develops a negative automatic gain control voltage across the parallel connected potentiometer 81 and the condenser 82, the arm of the potentiometer 81 being adjustable to provide a suitable adjustment of the gain in the video and sound I. F. amplifier 12, and hence an adjustment of the contrast of the reproduced picture. In this connection, it will be understood that the takeoff of the 4.5 mc. intercarrier sound signal may be done at a point other than the plate circuit of the second detector tube 32. Thus, a conventional two-stage video amplifier may be employed wherein the video gain is controlled in the first video stage and the 4.5 mc. intercarrier sound signal is derived from the second video amplifier stage and supplied to the amplifier 21. In such a case a 4.5 mc.

filter having a resistive input would be employed to extract the 4.5 mc. signal without introducing phase distortion into the succeeding video amplifier stage.

In Fig. 3 of the drawings there is shown a color television receiver, partially indicated in block diagram form, wherein the 4.5 intercarrier beat note component and the 3.58 color subcarrier component are both removed from the video signal without producing phase distortion of the other frequency components of the video signal. More particularly, color television signals which are intercepted by the antenna system 100 of the receiver shown in Fig. 3 are converted into corresponding intermediate frequency signals in the tuner 101 which are amplified in the common video and sound I. F. amplifier 102. In order to prevent the generation of a 920 kc. beat note between the 4.5 mc. intercarrier sound signal and the 3.58 color subcarrier signal in the video second detector 105, a separate detector 103 is provided for the 4.5 mc. intercarrier sound signal and a tuned circuit 104 is provided between the sound detector 103 and the video second detector 105, the circuit 104 being tuned to the I. F. sound carrier so as to provide substantial attenuation of this carrier prior to the heterodyning operation in the video second detector 105. The sound second detector 103 includes a condenser 110 which is connected to the anode of the last amplifier tube in the amplifier 102 and couples both the video and sound carriers to the crystal rectifier 111 so as to derive a 4.5 mc. intercarrier sound signal across the tuned circuit 112. The 4.5 mc. intercarrier sound signal developed across the tuned circuit 112 is amplified in the 4.5 mc. I. F. amplifier and limiter 113, the limiter portion of the circuit 113 being provided with a 4.5 mc. takeoff circuit similar to the circuit described in detail in connection with the 4.5 mc. limiter 22 of the system shown in Fig. 1. Accordingly, a 4.5 mc. cancellation signal is developed at the terminal A of the circuit 113 which may be suitably shifted in phase to provide cancellation of the 4.5 mc. beat note component in the luminance video signal, as will be described in more detail hereinafter. The 4.5 mc. sound signal is detected and amplified in the discriminator and audio amplifier 114 and the resultant sound signal is applied to the loud-speaker 115 of the color television receiver.

The video second detector 105 includes a crystal rectifier 120 which is arranged to develop the color video signal across the output network 121, it being understood that the sound carrier is substantially attenuated by the circuit 104 so that a relatively small 920 kc. beat note component is produced by heterodyning the 4.5 mc. intercarrier components and the 3.58 mc. color subcarrier signal in the rectifier 120. However, it will be understood that a 4.5 mc. beat note component is itself produced across the output network 121 due to heterodyning between the video and sound carriers and this 4.5 mc. beat note component must be removed from the video signal before application to the color picture tube 123. Also, the 3.58 mc. color subcarrier signal is developed across the output network 121 and must be removed after the chroma channel takeoff point to prevent the appearance of the 3.58 mc. signal in the reproduced color picture and also to prevent a 920 kc. beat note from being developed in a subsequent nonlinear signal transmission element such as the color picture tube 123.

The video second detector 105 is directly coupled to a first video amplifier 124, which is provided with a 3.58 mc. tuned transformer 125 in the anode circuit thereof for deriving the 3.58 mc. color burst synchronizing signal which is supplied to the color synchronizing circuit 126. The output of the video amplifier 124 is also coupled through the condenser 127 to the deflection synchronizing circuit and keyed AGC circuit 128 so as to provide synchronization for the horizontal and vertical deflection circuits 129 which energize the vertical and horizontal scanning coils 130 and 131 which surround the neck of the color picture tube 123. In addition, the keyed AGC portion of the circuit 128 is provided with a potentiometer 132 so as to supply a variable AGC voltage to the video and sound I. F. amplifier 102 so as to provide a variable contrast control for the receiver in a manner substantially identical to that described above in connection with the monochrome receiver of Fig. 1. The video amplifier 124 is also connected through the delay line 135 to a second video amplifier stage 136 the luminance output or so-called $E'_y$ signal, of which is added to the color difference signals developed in the chrominance channel of the receiver to provide the desired color signals which may be impressed upon the three electron guns of the picture tube 123.

The color synchronization circuit 126 included a suitable color burst amplifier, phase detector and reactance tube for maintaining the 3.58 mc. crystal oscillator 140 in phase with the color burst signal so that the crystal oscillator output signals may be employed as reference signals for the color demodulators of the receiver. More particularly, the crystal oscillator 140 is provided with a first tuned output transformer 141 having a secondary winding 142 which is arranged to provide a first reference signal for the Q demodulator 143, the output from the oscillator 140 also being coupled to a quadrature amplifier 144 which is provided with a tuned output transformer 145 having a secondary 146 for developing a quadrature reference signal which is impressed upon the I demodulator 147.

In the system of Fig. 3 the chrominance information is derived from the cathode resistor 160 of the video amplifier 124 and is coupled to the band pass amplifier 161 which has a 2–4 mc. band pass characteristic necessary to separate the color signal information from the remainder of the composite television signal. The output of the band pass amplifier 161 is coupled through the condenser 150 to both the I demodulator 147 and the Q demodulator 143 so that the $E_I$ and $E_Q$ components may be obtained therein by product demodulation as will be readily understood by those skilled in the art. The I and Q demodulators 147 and 143 include suitable phase inverters so that positive and negative $E_I$ and $E_Q$ signals may be impressed upon the matrix 178 in the correct amount to derive the desired color difference signals. These color difference signals are additively impressed upon the red adder circuit 170, the blue adder circuit 171 and the green adder circuit 172, the color signal outputs of the circuits 170, 171 and 172 being impressed upon the control grids of the corresponding electron guns of the picture tube 123 and the cathodes of these guns being connected together to a suitable source of bias potential to permit background level control. In this connection, it will be understood that the chrominance information may be separated from the luminance signal in any desired manner insofar as the present invention is concerned. For example, a separate second detector may be employed to derive the chrominance information from the video and sound I. F. amplifier 102 or a split I. F. amplifier may be provided with separate luminance and chrominance detectors as the outputs thereof.

In accordance with the present invention, the band pass amplifier 161 is also employed to derive a 3.58 mc. cancellation signal which may be utilized to remove the undesired 3.58 mc. color subcarrier from the luminance or $E'_y$ signal without producing phase distortion of the other frequency components of this signal. More particularly, the color subcarrier signal is derived by means of a series resonant circuit including the coil 151 and the condenser 152 which are tuned to 3.58 mc., this tuned circuit being isolated from the band pass amplifier 161 by means of the resistor 153 so that the tuned circuit 151, 152 does not affect the band pass characteristic of the amplifier 161. A potentiometer 154 is connected across the condenser 152 so that a variable amplitude 3.58 mc.

cancellation signal is produced at the arm of the potentiometer 154, i. e., the indicated circuit terminal B in Fig. 3. This 3.58 mc. cancellation signal is then shifted in phase by the desired amount by means of a phase shifting network 155 and is fed through an isolation resistor 156 to the output of the video amplifier 136. Preferably, the required phase shift is determined by means of the network shown in Fig. 2 and described in detail in connection with the system of Fig. 1, it being understood that when the network of Fig. 2 is used in the system of Fig. 3 the condenser 65 is connected to the arm of the potentiometer 154 and the arm of the potentiometer 70 is connected to the mixing resistor 156. The amplitude of the 3.58 mc. cancellation signal is adjusted by means of the potentiometer 154 and the phase shift adjusted by means of the potentiometer 70 so that the 3.58 mc. cancellation signal coupled through the resistor 156 to the output of the amplifier 136 exactly cancels the 3.58 mc. color subcarrier component of the video signal developed by the amplifier 136. The network of Fig. 2 is then removed and the fixed network 155 substituted therefor with the same phase shift characteristic. In this connection, it will be understood that the phase shifting network of Fig. 2, or any other suitable variable phase shifting network, may be employed in either the system shown in Fig. 1 or the system shown in Fig. 3 in place of the network 75, 76, 77 or the network 155 in the event that it is desired to provide adjustment of the phase shift to take care of changes in tube characteristics and gain of the receiver, as will be readily understood by those skilled in the art.

In order to remove the 4.5 intercarrier sound mc. component from the $E'_y$ signal, the limiter tube in the 4.5 mc. I. F. amplifier and limiter 113 is provided with a 4.5 mc. takeoff circuit, similar to the corresponding circuit described in detail in connection with the limiter 22 of Fig. 1, so that a 4.5 mc. cancellation signal is developed at the terminal A of the circuit 113 and is coupled through the phase shifting network 175 and the isolating resistor 176 to the conductor 177 which connects the amplifier 136 to the matrix 178. The network 175 is designed by employing the variable phase shifting network of Fig. 2 in the manner described above so that the 4.5 mc. signal coupled through the resistor 176 exactly cancels the 4.5 mc. intercarrier sound component of the $E'_y$ signal appearing on the conductor 177. As a result, the 4.5 mc. intercarrier beat note component and the 3.5 mc. color subcarrier component are removed from the luminance or monochrome video signal on the conductor 177 without providing tuned trap circuits at either of these frequencies so that no phase distortion is introduced in the monochrome video channel and the fine detail of the reproduced color picture is substantially improved. In this connection, it will be understood that the 4.5 mc. cancellation signal and 3.58 mc. cancellation signal may be coupled directly to the commonly connected cathodes of the color picture tube 123 so that the undesired 4.5 mc. and 3.58 mc. components are removed within the picture tube 123 in a manner similar to that described above in connection with the system of Fig. 1.

While there have been described what are at present considered to be the preferrred embodiments of the invention, it will be understood that various modifications may be made therein which are within the true spirit and scope of the invention as defined in the appended claims.

What is claimed as new and is desired to be secured by Letters Patent of the United States is:

1. In a television receiver of the intercarrier sound type, a common video and sound carrier channel, a video signal channel, detector means connected between said common channel and said video signal channel for developing a video signal having a beat note component of a frequency equal to the frequency difference between the video and sound carriers, means for supplying said video signal to said video signal channel, an intercarrier sound channel, means for deriving from said common channel a heterodyne signal of said frequency difference and supplying the same to said intercarrier sound channel, and means for coupling said heterodyne signal from said intercarrier sound channel into said video signal channel in the correct amplitude and phase to remove said beat note component from said video signal without causing substantial phase distortion of the resultant video wave.

2. In a television receiver of the intercarrier sound type, a common video and sound carrier channel, detector means connected to said common channel, said detector means including a first output circuit for deriving a video signal from said common channel, said derived video signal having a beat note component of a frequency equal to the frequency difference between the video and sound carriers, said detector means including a second output circuit for selectively deriving a heterodyne signal corresponding to the beat note component of said video signal, first amplifier means connected to said first output circuit for amplifying said video signal without selectively attenuating said beat note component thereof, second amplifier means connected to said second output circuit for amplifying said heterodyne signal, and means for injecting a heterodyne signal from said second amplifier means into said first amplifier means in the correct phase and amplitude to remove said beat note component from said video signal without causing substantial phase distortion of the resultant video wave.

3. In a television receiver of the intercarrier sound type, a common video and sound carrier channel, detector means connected to said common channel, said detector means including a first output circuit for deriving a video signal from said common channel, said derived video signal having a beat note component of a frequency equal to the frequency difference between the video and sound carriers, said detector means including a second output circuit for selectively deriving a heterodyne signal corresponding to the beat note component of said video signal, first amplifier means connected to said first output circuit for amplifying said video signal without selectively attenuating said beat note component thereof, second amplifier means connected to said second output circuit for amplifying said heterodyne signal, a cathode ray tube viewing device, means for connecting said amplified video signal to one control electrode of said tube, means for deriving from said second amplifier means a heterodyne signal of the same amplitude and phase as the beat note component of said amplified video signal, and means for impressing said derived heterodyne signal on another control electrode to cancel said beat note component of said amplified video signal and prevent the same from appearing in the television image reproduced by said cathode ray tube viewing device.

4. In a television receiver of the intercarrier sound type, a common video and sound carrier channel, detector means connected to said common channel, said detector means including a first output circuit for deriving a video signal from said common channel, said video signal having a beat note component of a frequency equal to the frequency difference between the video and sound carriers, said detector means including a second output circuit for selectively deriving a heterodyne signal corresponding to the beat note component of said video signal and modulated with the sound signal accompanying said video signal, first amplifier means connected to said first output circuit for amplifying said video signal without selectively attenuating said beat note component thereof, second amplifier means connected to said second output circuit for amplifying said heterodyne signal, a cathode ray tube viewing device, means for connecting said amplified video signal to one control electrode of said tube, means connected to the output of said second amplifier means for detecting said amplified heterodyne signal to derive said sound signal, a sound reproducing device, means for amplifying said detected sound signal and impressing the same on said sound reproducing device, means for deriving from said second amplifier means a heterodyne signal of the same amplitude and phase as the beat note component of said amplified video signal, and means for impressing said derived heterodyne signal on another control electrode of said cathode ray tube to cancel said beat note component of said amplified video signal and prevent the same from appearing in the television image reproduced by said cathode ray tube viewing device.

5. In a television receiver of the intercarrier sound type, a common video and sound carrier channel having a pair of output terminals, a detector tube having at least a cathode, a control grid and an anode, means connecting the control grid of said tube to one output terminal of said common channel, means including a high impedance element connected between the cathode of said tube and the other output terminal of said common channel for deriving a video signal having a beat note component of a frequency equal to the frequency difference between the video and sound carriers, means including a tuned circuit connected in the anode circuit of said tube for deriving a heterodyne signal corresponding to said beat note component and modulated by the sound signal accompanying said video signal, means for separately amplifying said video signal and said heterodyne signal, and means for combining said amplified heterodyne signal and said amplified video signal in the correct amplitude and phase to cancel the beat note component of said amplified video signal.

6. In a television receiver of the intercarrier sound type, a common video and sound carrier channel having a pair of output terminals, a detector tube having at least a cathode, a control grid and an anode, means connecting the control grid of said tube to one output terminal of said common channel, means including a high impedance element connected between the cathode of said tube and the other output terminal of said common channel for deriving a video signal having a beat note component of a frequency equal to the frequency difference between the video and sound carriers, means including a tuned circuit connected in the anode circuit of said tube for deriving a heterodyne signal corresponding to said beat note component and modulated by the sound signal accompanying said video signal, means for amplifying said video signal without selectively attenuating the beat note component thereof, means including a signal translating tube for amplifying said heterodyne signal, a series resonant circuit in the cathode circuit of said signal translating tube and tuned to the frequency of said beat note component, means for deriving from one of the reactive components of said series resonant circuit a voltage of the same amplitude as the beat note component of said amplified video signal, a signal mixer having a pair of input electrodes, and means for impressing said amplified video signal on one of said electrodes and said voltage on the other of said electrodes in the correct amplitude and phase to remove the beat note component from said amplified video signal.

7. In a television receiver, a common video carrier and color subcarrier channel, a luminance video channel connected to said common channel for transmitting therethrough a luminance video signal having a color subcarrier component included therein, a chrominance channel connected to said common channel for selectively transmitting said color subcarrier and modulation components thereof, means for deriving a color subcarrier cancellation signal, and means for coupling said color subcarrier cancellation signal from said last named means into said luminance video channel in the correct amplitude and phase to remove said color subcarrier component from said luminance video signal without causing substantial phase distortion of the other frequency components of said luminance video signal.

8. In a television receiver, a common video carrier and color subcarrier channel, a luminance video channel connected to said common channel for transmitting therethrough a luminance video signal having a color subcarrier component included therein, a chrominance channel connected to said common channel for selectively transmitting said color subcarrier and modulation components thereof, means for deriving from said chrominance channel a color subcarrier cancellation signal of the same amplitude as the color subcarrier component of said luminance video signal, and means for mixing said cancellation signal and said luminance video signal in the correct phase to remove said color subcarrier component form said luminance video signal.

9. In a television receiver, a common video carrier, sound carrier and color subcarrier channel, a luminance video channel connected to said common channel for transmitting therethrough a luminance video signal having a color subcarrier component and a beat note component of a frequency equal to the frequency difference of said video and sound carriers, a chrominance channel connected to said common channel for selectively transmitting said color subcarrier and modulation components thereof, means for deriving from said chrominance channel a color subcarrier cancellation signal of the same amplitude as the color subcarrier component of said luminance video signal, an intercarrier sound channel connected to said common channel for selectively transmitting a heterodyne signal of said frequency difference therethrough, means for deriving from said intercarrier sound channel an intercarrier sound cancellation signal of the same amplitude as the beat note component of said luminance video signal, and means for mixing said luminance video signal and said cancellation signals in the correct phase to remove said color subcarrier component and said beat note component from said luminance video signal without producing phase distortion of the resultant luminance video signal.

References Cited in the file of this patent

UNITED STATES PATENTS

| | | |
|---|---|---|
| 2,223,982 | Bedford | Dec. 3, 1940 |
| 2,680,147 | Rhodes | June 1, 1954 |

FOREIGN PATENTS

| | | |
|---|---|---|
| 656,603 | Great Britain | Aug. 29, 1951 |